PHONOGRAPH TONE-ARM

Filed Aug. 4, 1948 2 Sheets-Sheet 1

INVENTOR:
RICHARD S. CRANMER
BY
Brown, Denk & Synnestvedt
AGENTS

June 19, 1951 R. S. CRANMER 2,557,176

PHONOGRAPH TONE-ARM

Filed Aug. 4, 1948 2 Sheets-Sheet 2

INVENTOR.
RICHARD S. CRANMER
BY
Brown, Denk & Synnestvedt
AGENTS

Patented June 19, 1951 2,557,176

UNITED STATES PATENT OFFICE 2,557,176

PHONOGRAPH TONE ARM

Richard S. Cranmer, Wyncote, Pa., assignor to Philco Corporation, Philadelphia, Pa., a corporation of Pennsylvania Application August 4, 1948, Serial No. 42,525

5 Claims. (Cl. 274—24)

The present invention relates to phonograph apparatus and, particularly, to phonograph tone-arms. More specifically, the invention has to do with improvements in the construction and operation of means incorporated in the tone-arm to support a sound reproducing pickup for cooperative engagement with the modulated groove of a phonograph record.

Recent developments in phonograph record players have made it possible to provide an improved crystal pickup which is characterized by its light weight and its adaptability to operate, with high fidelity, at extremely low needle-pressure. A pickup of this improved type is disclosed and claimed in the co-pending application of Cleon D. O'Neal, Serial No. 59,168 filed November 9, 1948, now Patent No. 2,547,227, issued April 3, 1951 and assigned to Philco Corporation. The improved pickup, generally, takes the form of a unitary cartridge which is adapted for slidable and removable engagement with a supporting structure provided within the head of the tone-arm.

It has been found that the provision of a suitable supporting structure for a pickup cartridge of the character mentioned, meets with certain difficulties which arise, chiefly, from the fact that variations from the adjusted position of the tone-arm perpendicularly to the record surface, unduly vary the needle-pressure. These variations in needle-pressure deleteriously affect the tracking engagement of the needle point with the groove of the record, and result in faulty and distorted reproduction. Experiments have shown that, with a pickup of the above stated type, the supporting structure should be capable not only of adequately retaining the pickup cartridge to insure proper tracking, but should be capable also of functioning to allow the pickup to move relatively to the tone-arm in response to vertical shock transmitted to the pickup through the needle.

It is, therefore, the primary object of this invention to provide a pickup supporting arrangement which eliminates the aforesaid difficulties and realizes the above-mentioned desirabilities. To that end, the supporting arrangement is of such character that the light-weight pickup, in effect, is suspended for firm tracking engagement, at the desired low needle-pressure, with the record groove and, yet, is free to move up and down with sudden changes in the playing level of the record, without transmitting such movements to the tone-arm.

It is also an object of the invention to provide a pickup supporting structure of the above-mentioned character, in which the parts are associated in such a manner as to insure the desired low needle-pressure at all times. For that purpose, the supporting structure includes a hingedly mounted clamping member for the pickup, which member maintains the pickup in proper position with respect to the adjusted operative position of the tone-arm in relation to the playing surface of the record.

Another and more specific object of the invention is to provide a pickup supporting structure which can be constructed of simple parts capable of being easily assembled and readily mounted in the head of the tone-arm. In accordance with this object of the invention, a unitary pivotal member is provided to clamp the pickup in position, and a single element provides means which serves to retain the pivotal member on its support and means which serves to maintain said member in proper relationship with the tone-arm, when the tone-arm is adjusted to provide the desired low needle-pressure.

These and other objects, and the manner in which they are attained, will be fully understood from the following description based on the accompanying drawings which illustrate a preferred embodiment of the invention. In the drawings, Figure 1 is a sectional-elevational view, on a greatly enlarged scale, of the head portion of a tone-arm provided with a pickup supporting structure constructed in accordance with the invention;

Figure 1:
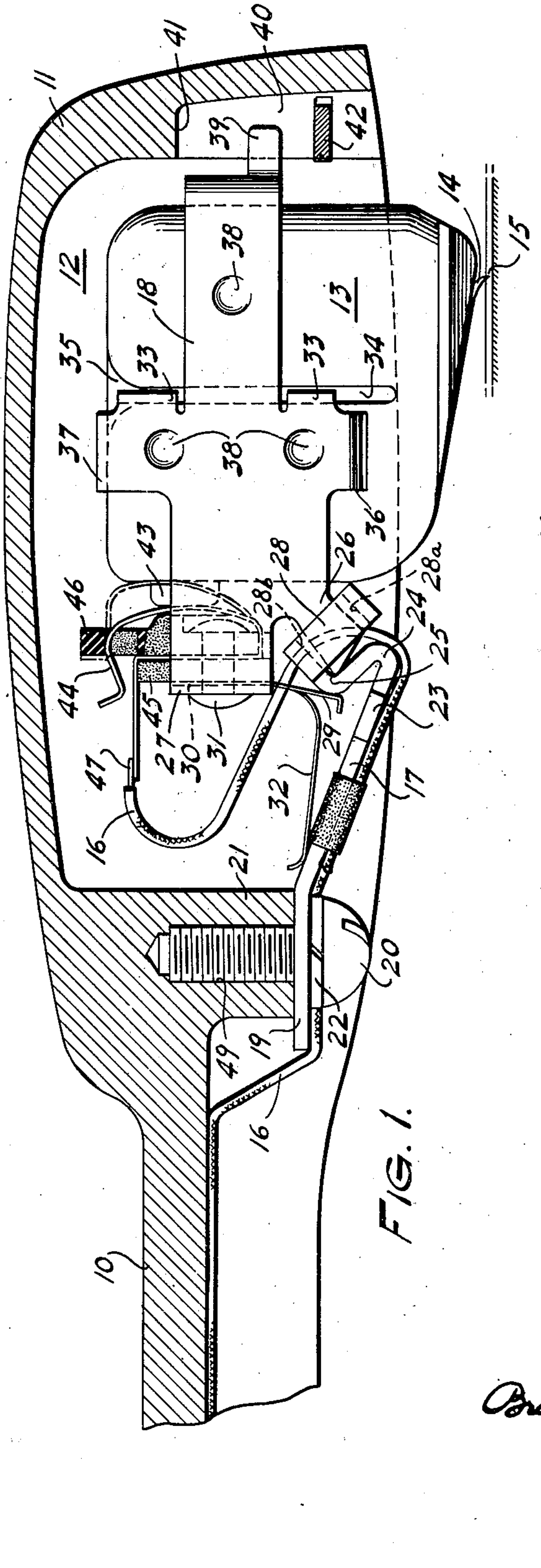
Figure 2:
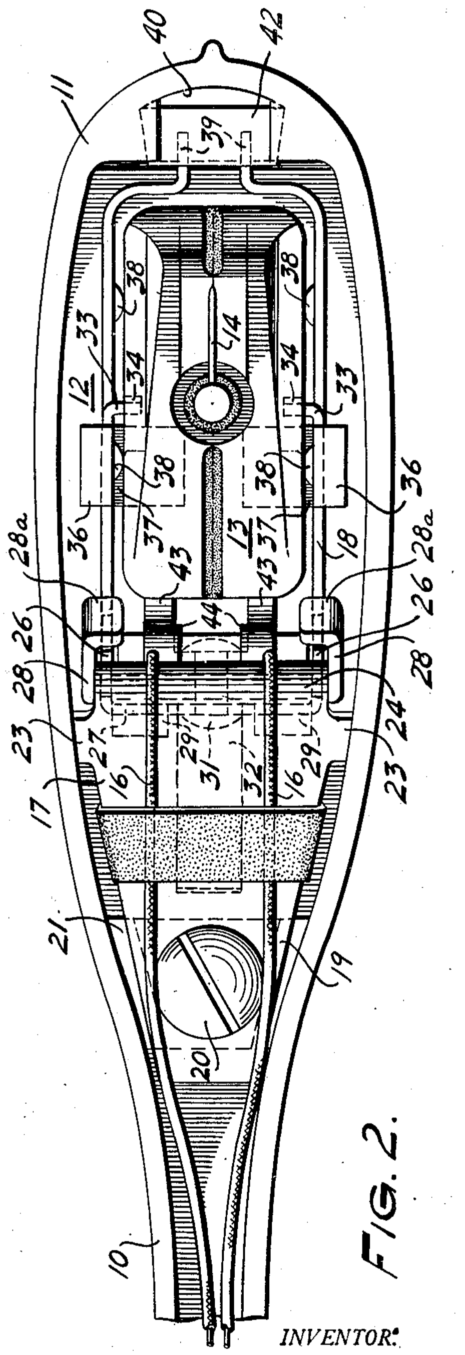
Figure 2 is a bottom plan view of the arrangement as shown in Figure 1.

Referring more particularly to Figures 1 and 2 of the drawings, the tone-arm 10, as shown, includes a hollowed head portion 11 which provides a recess 12. This recess opens at the underside of the tone-arm head, and is adapted to house the supporting structure for a pickup cartridge 13. As above indicated, the construction of the pickup cartridge constitutes the subject matter of the aforesaid copending application of Cleon D. O'Neal, and forms no part of the present invention, except insofar as it cooperates with its supporting structure. It is sufficient to state here that the pickup cartridge encloses a piezoelectric crystal unit which is driven by reason of its association with a needle 14, the point of which is disposed for engagement with the modulated groove of a record, as represented at 15 in Figure 1. Driving of the piezoelectric crystal unit generates electrical signals which are transmitted, through leads 16, to the audio amplifier of a conventional radio apparatus (not shown) for converting said signals into audible sounds. It is significant to note that the pickup cartridge is especially devised to be of light weight and to track at low needle-pressure. In practice, the completely assembled cartridge weighs approximately 3½ grams, and is adapted to track at a needle-pressure of the order of 5 grams.

Because of this exceedingly light weight and low tracking needle-pressure, it is important that the supporting structure for the pickup be such that it can readily absorb shocks transmitted to it from the playing surface of the record and, therefore, it will be appreciated that the manner of supporting the pickup in the tone-arm, as well as the manner of mounting the tone-arm itself, becomes critical. The means for mounting the tone-arm to insure the desired low needle-pressure, and the means providing for the unobstructed tracking motion of the supported pickup are not shown, but suitable means for these purposes are disclosed and claimed in the copending applications of Hermann Lingenbrink, Serial No. 45,062, filed August 19, 1948, and of Louis C. Ammlung, Jr., Serial No. 48,426, filed September 9, 1948, which applications are assigned to Philco Corporation.

The present invention is directed to the manner of supporting the pickup. In accordance with this invention, the pickup supporting structure basically comprises a support 17 adapted for fixed connection with the tone-arm, and a pickup cartridge clamping member 18 adapted for yieldable pivotal connection with said support. In the embodiment shown, the support 17 takes the form of a generally S-shaped plate, one end 19 of which is adapted to be conveniently affixed to a portion of the tone-arm, for instance, by means of a fastening element 20. This fastening element engages said end 19 of the support and is arranged in screw threaded engagement with the rear wall 21 of the recess-forming head portion 11 of the tone-arm. A locking washer 22 is advantageously used between the head of fastening element 20 and the end 19 of support 17, so as to insure positive retention of said support in its position. Each of the side edges of the support is also advantageously provided with a lateral projection 23. These projections are disposed for bearing engagement with adjacent side wall portions of the tone-arm head, to prevent sidewise displacement of the support relatively to said head. The other or free end portion 24 of the generally S-shaped support, provides seats 25 for the pivotal mounting of the cartridge clamping member 18, as will be presently described.

Figure 3:
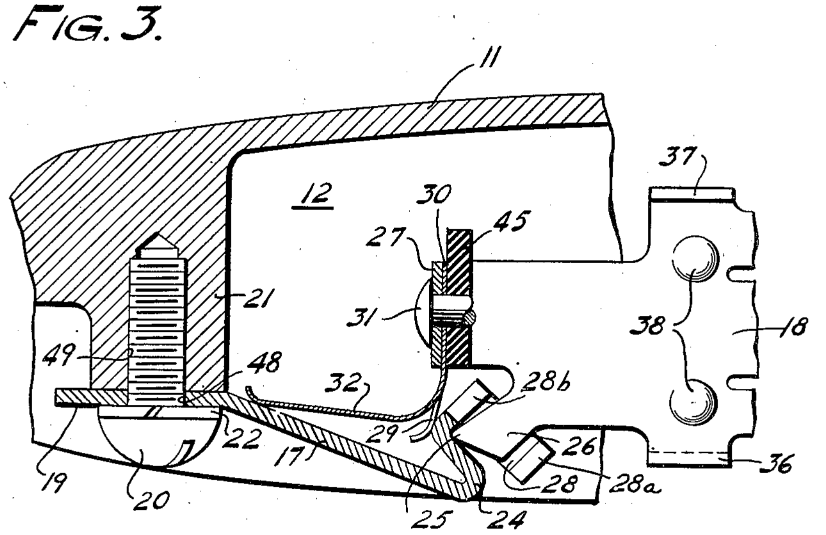
Figure 3 is a fragmentary view which shows, in section, certain of the parts included in the arrangement as illustrated in Figure 1.

This member 18 comprises a substantially U-shaped strip of suitable material which has sufficient resiliency to effect a proper clamping action about the side faces of the pickup cartridge. A pivot which takes the form of an angularly extending pointed lug 26, depends from each of the lower side marginal edges of the U-shaped strip at a point adjacent the closed end 27 of said strip. These pivots or pointed lugs are adapted to sit in seats 25 and, thus, provide pivotal points about which the cartridge clamping member may rock bodily. A side extension 28 is arranged on each of the seat-forming portions on support 17, and lies adjacent the outer side face of the corresponding lug 26 to prevent undesirable sidewise movement of the cartridge clamping member. These side extensions also serve to prevent excessive relative pivotal movement between the pickup clamping member and its support and, for that purpose, are provided with angular portions 28*a* and 28*b* which, as more clearly shown in Figures 1 and 3, are disposed in overlapping spaced relationship with the opposite edge portions of lugs 26.

Figure 4:
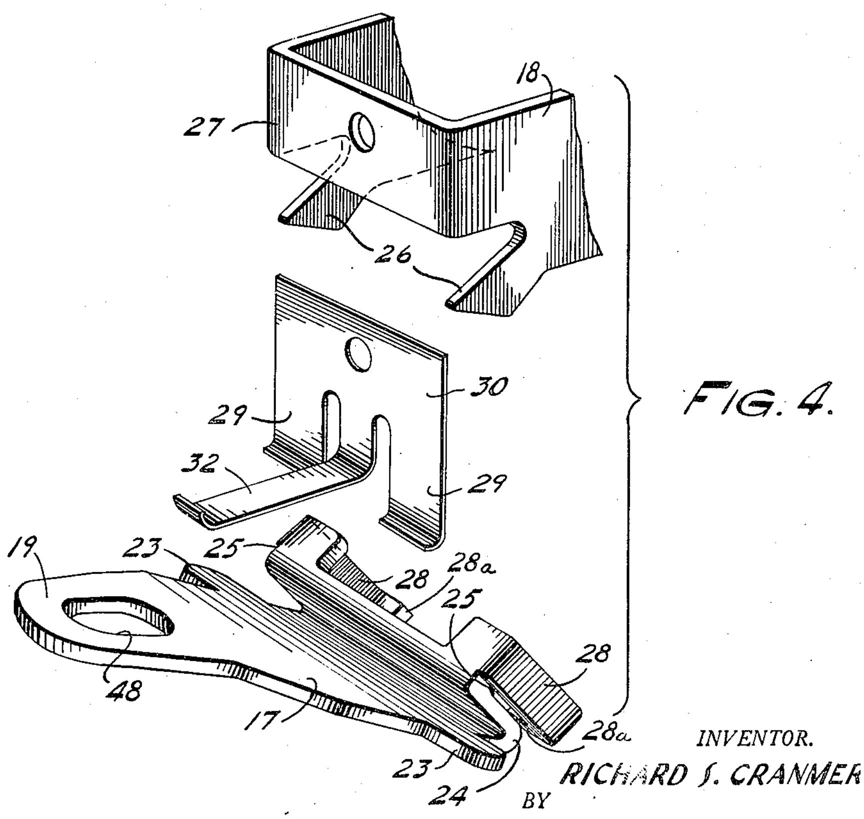
Figure 4 is an exploded view showing, in perspective, certain related elements of the pickup supporting member.

In accordance with the invention, proper seating and retention of the lugs 26 in their seats 25, is obtained by utilizing spring means in the form of a pair of spaced or side spring fingers 29 which, as more clearly seen in Figure 4, are provided on a spring metal plate 30. This plate, as more clearly seen in Figures 1 and 3, is mounted on the closed end 27 of the U-shaped clamping member 18, for instance, by means of a rivet 31. The side spring fingers 29 are such that they cooperate with pointed lugs 26 to form clips which frictionally bear against the opposite surfaces of the seat-forming portions 25 of the support 17, so as to urge and to maintain said pointed lugs in firm contact with their seats. Thus, the spring fingers 29 and pointed lugs 26 insure positive pivotal connection between the support 17 and cartridge clamping member 18, and still permit ready mounting and removal of said member by merely slipping said fingers and lugs into and out of engagement with the cooperative surfaces of the seat-forming portions of the support.

Also in accordance with this invention, yieldable pivotal movement of the cartridge clamping member 18 about its pivotal points, is obtained by utilizing spring means in the form of a third or intermediate spring finger 32 on the spring metal plate 30. This latter spring finger is extended for engagement with the upper surface of support 17. It is important to note that the spring means or finger 32 is not provided for the purpose of obtaining the desired low needle-pressure, but that such needle-pressure is obtained through function of the tone-arm and its mounting, for instance, in the manner shown and described in the aforementioned application of Hermann Lingenbrink. In fact, it is a characteristic feature of the invention that once the proper needle-pressure is determined through adjustment of the tone-arm mounting, the tension of spring finger 32 can be set, by bending said finger to a greater or lesser extent, so as not to affect the predetermined needle-pressure during operation at the normal level of the playing surface. When thus set, the spring finger 32 acts to maintain the needle point in tracking engagement with the record groove and at substantially constant needle-pressure, regardless of variations in the level of the playing surface. In other words, the provision and action of spring finger 32 permits said member and cartridge to oscillate up and down in accordance with variations in the playing surface level, without changing the operative level of the tone-arm and, therefore, without materially affecting the preset low needle-pressure.

The yieldability of the cartridge mounting has the additional advantage of protecting the needle 15 and its point from injury, should the tone-arm be accidentally dropped onto the record. It will be apparent that, when the arm is so dropped, the needle point which would ordinarily strike the surface of the record with undue force, is relieved from the shock, because the yieldable spring mount permits the cartridge to retract into the tone-arm head.

As previously pointed out, the pickup cartridge is adapted to slide into and out of engagement with its clamping member 18. For that purpose, each of the opposite side arms of said member is provided with inwardly projecting guide tongues 33 which, as shown in Figures 1 and 2, are disposed to engage a groove 34 provided on each of the opposite faces of the cartridge. The tongues 33 and grooves 34 also cooperate to prevent undue rotational movement of the cartridge in relation to the clamping member.

As indicated at 35 in Figure 1, the upper extremity of each groove is outwardly flared to facilitate engagement of the grooves with the guide tongues, when the cartridge is introduced into engagement with the clamping member. Introduction of the cartridge into engagement with its clamping member is also aided by means of an outwardly flaring extension 36 on each of the lower edges of said member, and correct elevation of the cartridge in the clamping member is determined by means of an abutment 37 extending inwardly and at right angles from each of the upper edges of said member to engage the upper marginal end portion of the cartridge. Inwardly depressed dimples 38 are advantageously arranged on each of the arms of the clamping member 18 to provide point contacts between the cartridge and its clamping member, in order to increase the frictional clamping action on the cartridge and to insure its proper alignment between the arms of said member.

Convenient stop means is employed to limit the upward movement of the clamping member when the cartridge is being introduced in said member, and also to limit the downward movement of the clamping member when the cartridge is being removed from said member. This stop means includes a rigid finger 39 projecting endwise from each of the arms of the clamping member and extending into a slot 40 provided internally of the forward end of the tone-arm head. The slot is such that its closed end wall 41 (Figure 1) serves as an abutment for the mentioned fingers 39 to arrest upward movement of the clamping member against the push exerted by movement of the cartridge when being brought into engagement with said members; and a cross piece 42 which is suitably affixed to portions of the tone-arm, closes the open end of slot 40 and serves as an abutment for said fingers 39 to arrest downward movement of the clamping member against the pull exerted by movement of the cartridge when being removed from the clamping member.

The rearward marginal edge portion of the pickup cartridge is provided with laterally spaced fixed contact terminals 43 which, as more clearly seen in Figures 1 and 2, are adapted for sweeping engagement with laterally spaced spring contact terminals 44. These spring contact terminals are conveniently supported by the closed end 27 of clamping member 18, for instance, by means of insulating blocks 45 and 46 which are anchored to said end 27 through the rivet 31. The spring contact terminals are connected, as at 47 (Figure 1), with the aforementioned leads 16.

The particular construction and mounting of the rigid contact terminals 43 and of the spring contact terminals 44, and the peculiar correlation of the mated terminals are described in detail and claimed in the copending application of Herman B. Spiegel, Serial No. 42,381, filed August 4, 1948, now Patent No. 2,532,377, issued December 5, 1950, and assigned to Philco Corporation. It is sufficient to state herein that the interengagement of spring contact terminals with the fixed contact terminals not only provides for a good electrical connection between the mated terminals, but also assists in stabilizing the cartridge in its clamping member, due to the fact that the spring terminals normally tend to urge the cartridge in a direction to effect snug engagement between the adjoining sides of tongues 33 and grooves 34 on the clamping member and on the cartridge, respectively.

From the foregoing description, it will be understood that the present invention makes it possible to provide a most practical and effective mounting arrangement for a light-weight pickup which is adapted to track at exceedingly low needle-pressure. The rigidity with which the arrangement holds the pickup, in conjunction with the flexibility of said arrangement, is most advantageous in insuring adequate tracking at the substantially constant and low needle-pressure employed.

It will be particularly appreciated that the relationship between the pickup holding member 18 and its support 17, makes it possible to assemble these parts as a unit which may then be readily mounted on the tone-arm. Such unit, in addition to member 18 and support 17, would include terminals 44 with leads 16 connected thereto, the spring fingers 39 and 32 on plate 30, and the blocks 45 and 46 which cooperate with rivet 31 to secure said terminals and plate on said member. In mounting the unit on the tone-arm, member 18 is inserted in recess 12 by first introducing fingers 39 between abutments 41 and 42 in slot 40. The unit is then moved until aperture 48 in end portion 19 of support 17 registers with threaded bore 49 in boss or wall portion 21 of the tone-arm head 11, whereupon screw-threaded element 20 is engaged through said aperture and with said bore to secure and to lock the unit in operative position within the recess 12 of said tone-arm head.

I claim:

1. For a phonograph tone-arm, a pickup supporting structure comprising a support adapted for connection with the tone-arm and having seat-forming portions, a pickup receiving and clamping member having pointed lugs in engagement with said seat-forming portions to provide for pivotal movement of said member in relation to said support, spring fingers extending from and carried by said member for cooperation with said lugs to form clips frictionally engaging opposite sides of the seat-forming portions of the support and pivotally retaining said member on the support, and another spring finger extending from and carried by said member and resiliently bearing on said support to provide for yieldable pivotal movement of said member.

2. For a phonograph tone-arm, a pickup supporting structure comprising a support adapted to be fixedly mounted on the tone-arm and having seat-forming portions, a pickup receiving and clamping member having pointed lugs in engagement with said seat-forming portions to provide for pivotal movement of said member in relation to said support, and an element secured to said member, said element having a pair of side spring fingers and an intermediate spring finger, said side fingers cooperating with said pointed lugs to form clips frictionally engaging opposite sides of the seat-forming portions of the support and pivotally retaining said member on the support, said intermediate finger resiliently bearing on the support to provide for yieldable pivotal movement of said member.

3. For a phonograph tone-arm, a pickup supporting structure comprising a support adapted to be fixedly mounted on the tone-arm and having seat-forming portions, a pickup receiving and clamping member having pointed lugs in engagement with said seat-forming portions to provide for pivotal movement of said member in relation to said support, an element secured to said member, said element having a pair of side spring fingers and an intermediate spring finger, said side fingers cooperating with said pointed lugs to form clips frictionally engaging opposite sides of the seat-forming portions of the support and pivotally retaining said member on the support, said intermediate finger resiliently bearing on the support to provide for yieldable pivotal movement of said member, and said seat-forming portions having side extensions overlapping said lugs to prevent sidewise sliding movement of said member on said support.

4. In a phonograph tone-arm, a hollowed head portion, a support fixed to the tone-arm and enclosed in said head portion, a pickup receiving and clamping member also enclosed in said head portion, said support having seat-forming portions and said member having pointed lugs in engagement with said seat-forming portions to provide for pivotal movement of the member in relation to the support, spring fingers extending from and carried by said member and cooperating with said lugs to form clips frictionally engaging opposite sides of the seat-forming portions of the support and pivotally retaining said member on the support, and another spring finger extending from and carried by said member and resiliently bearing on said support to provide for yieldable pivotal movement of said member.

5. In a phonograph tone-arm, a hollowed head portion, a support fixed to the tone-arm and enclosed in said head portion, said support having seat-forming portions, a pickup receiving and clamping member also enclosed in said head portion and having pointed lugs in engagement with said seat-forming portions to provide for the pivotal movement of said member in relation to said support, and an element secured to said member, said element having a pair of side spring fingers and an intermediate spring finger, said side fingers cooperating with said pointed lugs to form clips frictionally engaging opposite sides of the seat-forming portions of the support and pivotally retaining said member on the support, said intermediate finger resiliently bearing on the support to provide for yieldable pivotal movement of said member.

RICHARD S. CRANMER.

REFERENCES CITED

The following references are of record in the file of this patent:

UNITED STATES PATENTS

| Number | Name | Date |
|---|---|---|
| 2,174,692 | Dunning | Oct. 3, 1939 |
| 2,294,575 | Schneider | Sept. 1, 1942 |
| 2,331,122 | Jones | Oct. 5, 1943 |
| 2,351,948 | Gay | June 20, 1944 |
| 2,375,658 | Johnson | May 8, 1945 |
| 2,453,894 | Chorpening | Nov. 16, 1948 |
| 2,475,785 | Jensen | July 12, 1949 |

FOREIGN PATENTS

| Number | Country | Date |
|---|---|---|
| 64,045 | Denmark | Oct. 22, 1945 |